June 10, 1930.   A. F. DEBELACK   1,762,680
BABY CONVEYANCE
Filed July 2, 1928   2 Sheets-Sheet 2
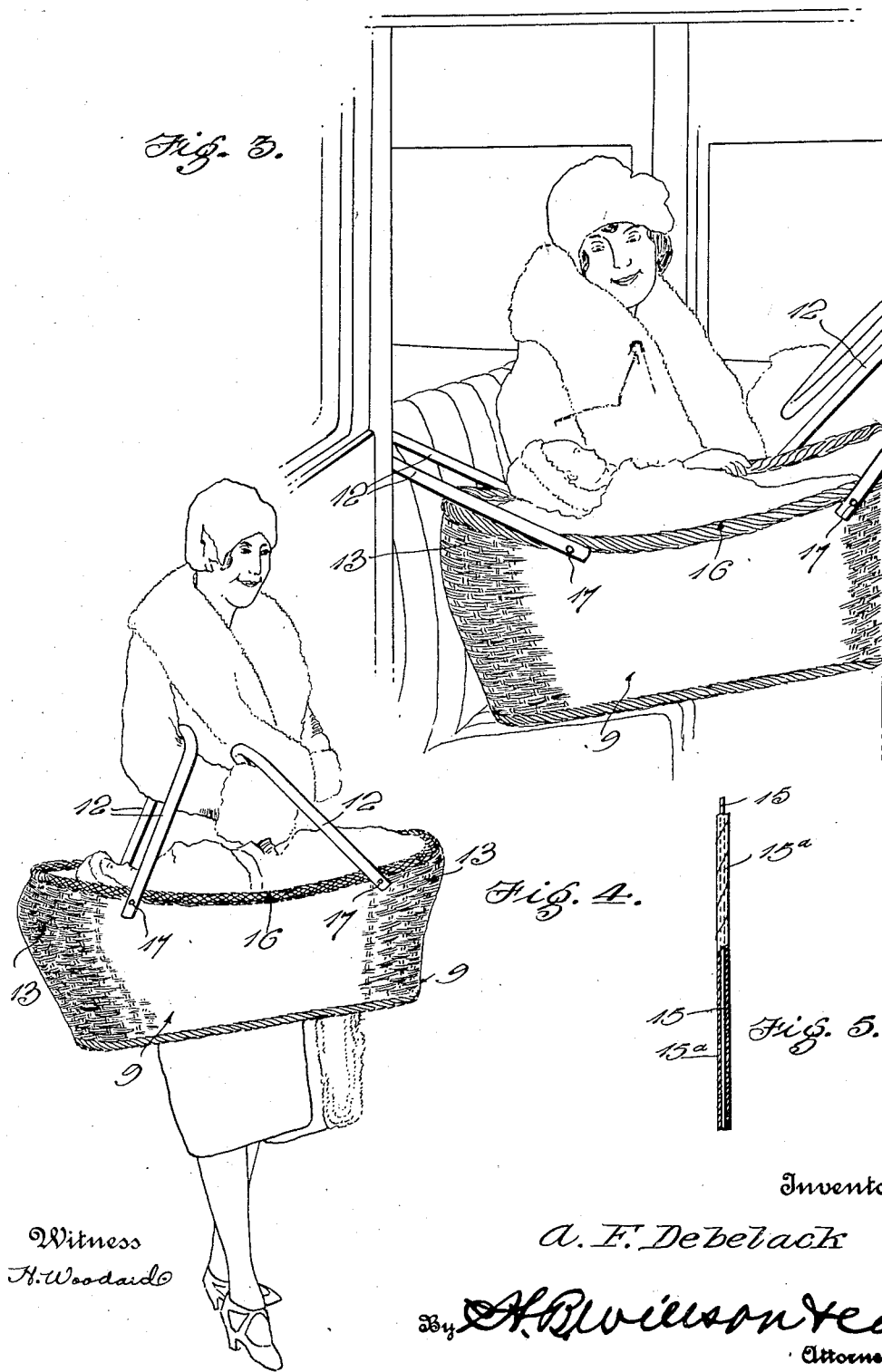
Inventor
A. F. Debelack Patented June 10, 1930

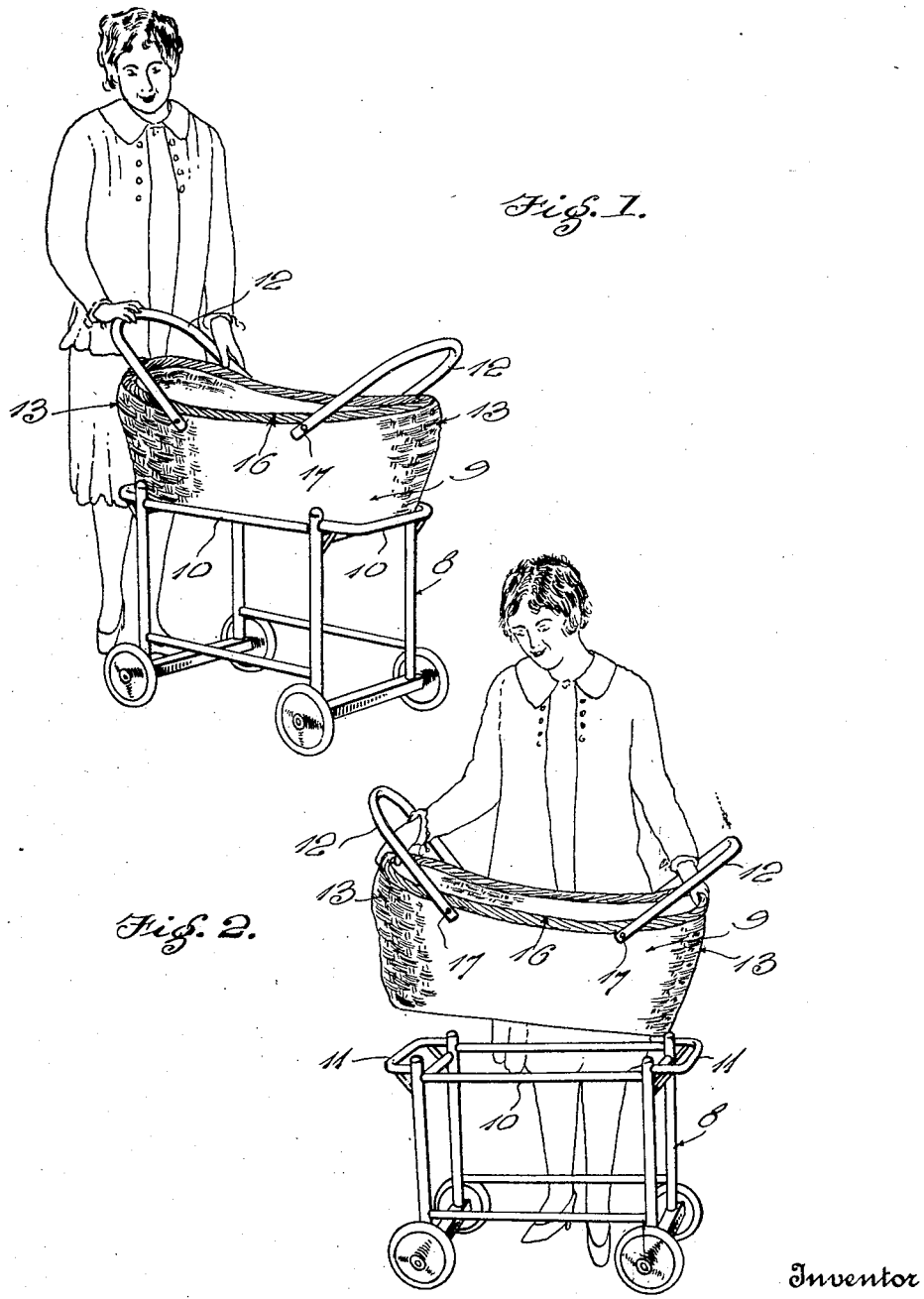

1,762,680

UNITED STATES PATENT OFFICE

ALEXANDER F. DEBELACK, OF SHEBOYGAN, WISCONSIN, ASSIGNOR TO MARIE MANNIS, OF SHEBOYGAN, WISCONSIN

BABY CONVEYANCE

Application filed July 2, 1928. Serial No. 289,991.

This application relates to a new and improved baby conveyance, embodying a wheeled supporting frame and a baby basket removably supported by said frame so that it may be used when lifted from the frame, to carry the infant from one place to another, to act as a crib upon an automobile seat, etc.

It is the principal object of the invention to provide a conveyance of the class set forth, in which the basket is provided with two pivoted-bail-handles, either of which may be outwardly swung to an inclined position, at which it acts as a handle for pushing or pulling the entire structure, said handles also acting as carrying handles when the basket and the infant are to be carried from one place to another.

With the foregoing in view, the invention resides in the novel subject matter hereinafter described and claimed, description being accomplished by reference to the accompanying drawing.

Fig. 1 is a perspective view of the complete conveyance showing the pivoted-bail-handles swung to such positions that either may be used for pushing or pulling the entire contrivance.

Fig. 2 is a perspective view illustrating the manner in which the basket may be easily lifted from the wheeled frame.

Fig. 3 is a perspective view illustrating the way in which the basket may be used as a crib upon an automobile seat.

Fig. 4 is a perspective view showing the manner in which the basket and the infant may readily be carried from place to place.

Fig. 5 is an enlarged detail sectional view through one of the "stakes" used in constructing the basket.

In the drawings above briefly described, the numeral 8 denotes a wheeled frame of the construction disclosed in my co-pending U. S. application, Serial No. 289,990 filed on even date herewith. This frame removably supports a basket 9 and is provided with basket-engaging bars 10—11 which hold said basket against horizontal shifting with respect to the frame. Two pivoted-bail-handles 12 are connected with the side walls of the basket 9 and have a multiple function. As shown in Fig. 1, either of these bails or both of them may be swung outwardly to an inclined position, providing an arched handle for pushing or pulling the entire conveyance. Then too, the handles 12 act as carrying handles for the entire basket 9 when it and the infant are to be carried from one place to another, as illustrated in Fig. 4.

The basket is of such depth as to readily accommodate a thick, soft kapok pad for the infant's comfort, and it is preferably of such length that it may rest upon the front seat of an automobile, between the seat back and the usual instrument board, as illustrated in Fig. 3.

The ends of the basket are outwardly bulged at 13 and are curved inwardly above the bulges, and the upper edge 16 of the basket wall inclines toward opposite ends as shown. This construction provides hood-like formations at both ends of the basket, readily accommodating ample foot and head coverings for use in cold weather.

In weaving the basket 9, I prefer to make use of "stakes" each of which embodies a wire core 15, and a fibrous strand 15ª wrapped around said core. This construction gives the necessary rigidity to the side walls of the basket, to prevent them from being distorted by the pivoted-bail-handles, when the latter are used to lift the basket and the infant, and these basket walls are so rigid that without any danger of accidental disconnection, the handles 12 may be pivoted to the basket by ordinary bolts 17 and appropriate washers.

Another advantage of the "stakes" constructed with the wire cores and the fibrous wrappings, is that these wrapings may be dyed in various colors before application to the cores, which step I perform in the manufacture of the basket. Hence, varicolored baskets may be produced which cannot be obtained in other ways.

On account of the existing advantages for the details disclosed, they are preferably followed. However, within the scope of the invention as claimed, minor variations may be made.

No claim is made herein to the basket construction or to the method of producing the varicolored effect.

I claim:—

A baby conveyance comprising a baby basket, a wheeled frame upon which said basket rests removably, all portions of said frame being sufficiently low to be unsuited for use as a handle for pushing or pulling the same, said frame having means for preventing horizontal movement of the basket with respect thereto, and two bail-handles pivoted to said basket, each of said bail-handles being swingable toward an end of the basket to an outwardly inclined position at which it projects longitudinally from the basket and frame and may be conveniently held by a standing person to serve as a handle for pushing or pulling the entire conveyance.

In testimony whereof I have hereunto affixed my signature.

ALEXANDER F. DEBELACK.